March 3, 1936. G. F. MARSHALL 2,032,489
SPEED TESTING DEVICE FOR MOTOR VEHICLES
Filed Jan. 19, 1934 2 Sheets-Sheet 2
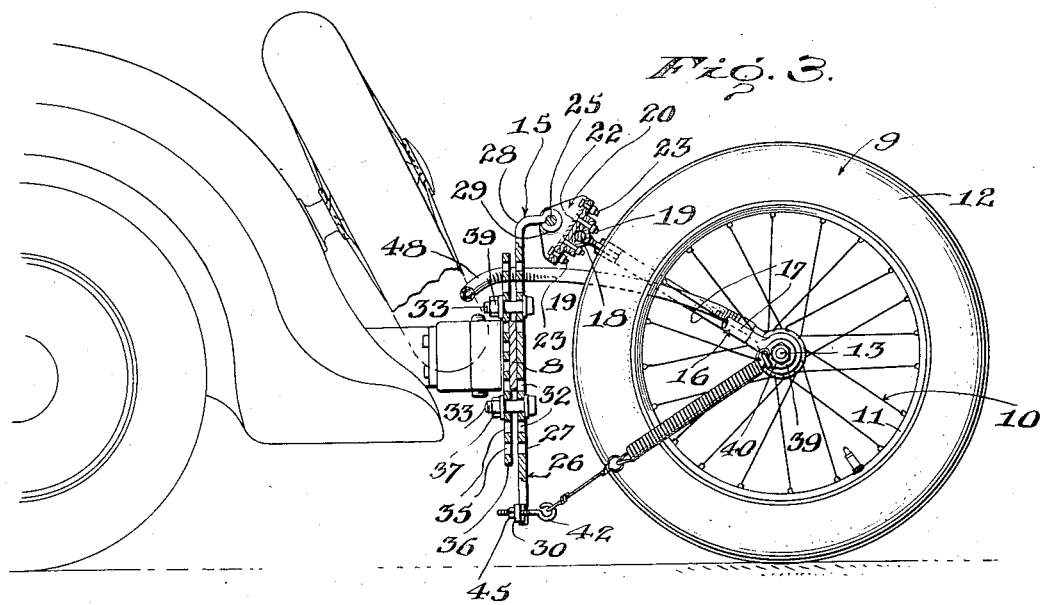
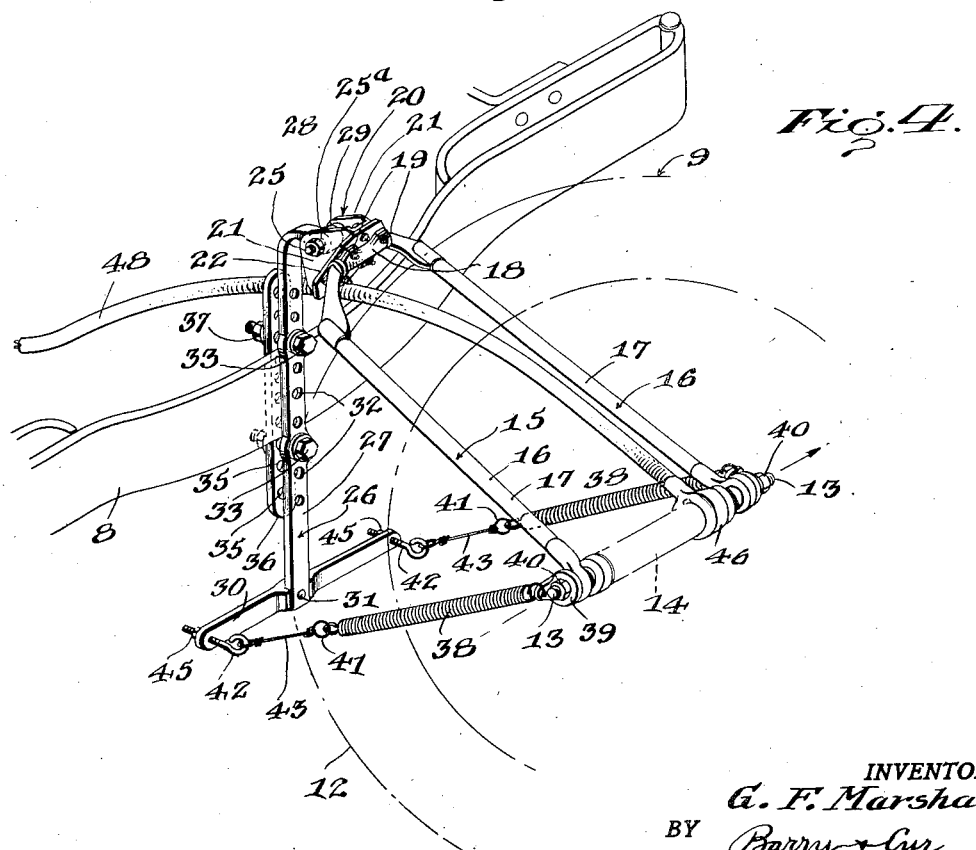
INVENTOR
G. F. Marshall
BY Barry + Cyr
ATTORNEYS Patented Mar. 3, 1936

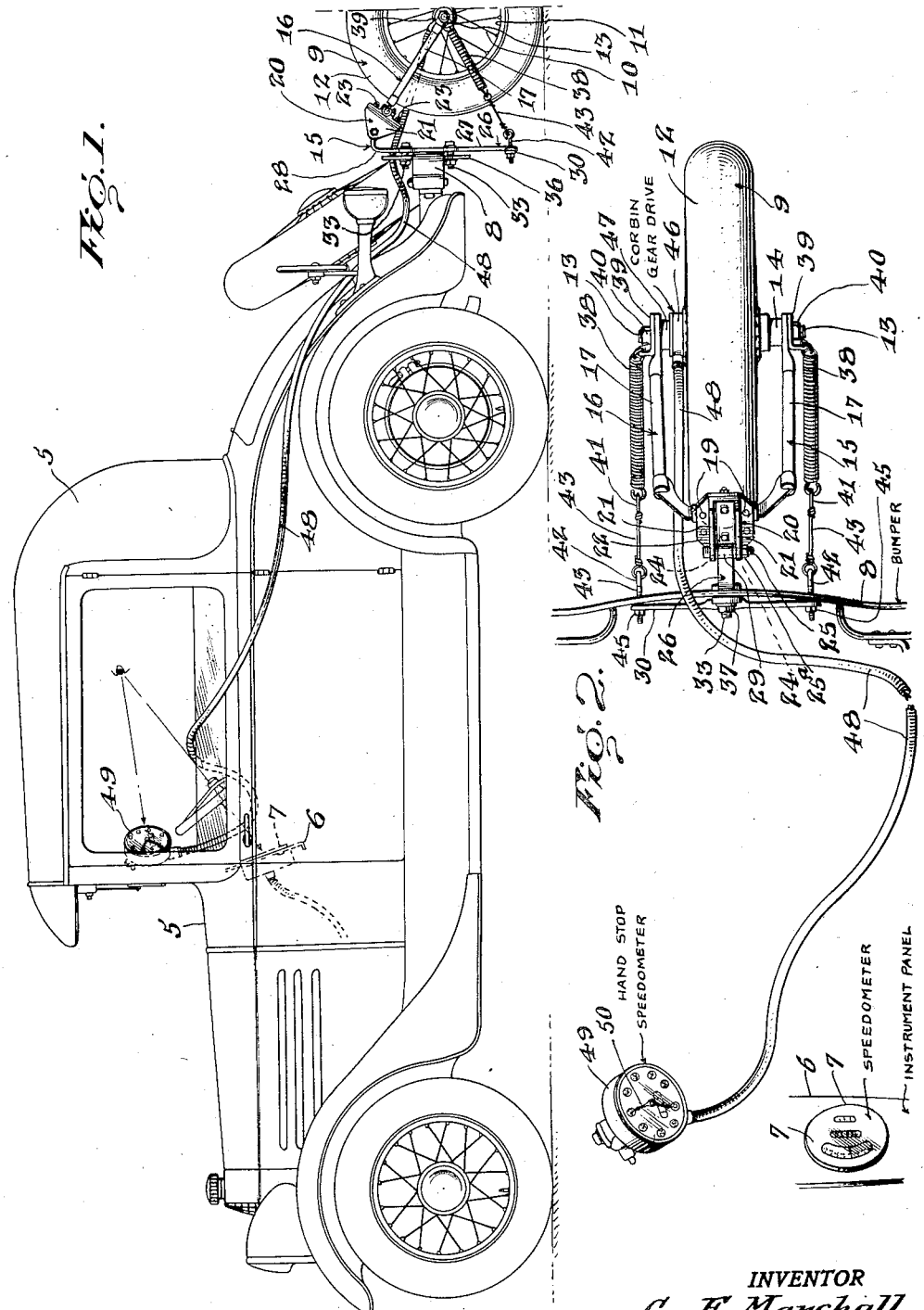

2,032,489

UNITED STATES PATENT OFFICE 2,032,489

SPEED TESTING DEVICE FOR MOTOR VEHICLES

George F. Marshall, New Rochelle, N. Y.

Application January 19, 1934, Serial No. 707,374

5 Claims. (Cl. 73—51)

The invention relates to improvements in speed testing and speed indicating devices, and more particularly to a novel attachment for motor vehicles for accurately indicating the speed of various types of motor vehicles independently of the conventional speed indicating means now in use on such vehicles.

The primary object of my invention is to provide a motor vehicle attachment, comprising an auxiliary traction wheel adapted to be detachably connected to the vehicle and having a standard speedometer assembly for precisely indicating the speed of the vehicle to the operator thereof.

A second main object of my invention is to provide a device of this character whereby the operator of a vehicle may test the accuracy of the conventional speed indicating device of that vehicle.

A further object is to provide a novel draft mechanism for detachably connecting the auxiliary wheel to various parts of the vehicle, and to vehicles of different types.

A still further object of my invention is to provide a draft device for attaching the auxiliary wheel to the rear of an automobile, comprising novel means for maintaining said wheel in frictional engagement with the road surface.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a side elevation of my improved device shown attached to the rear bumper of an automobile.

Fig. 2 is a top plan view, partly in perspective, of the complete assembly.

Fig. 3 is a side elevation, partly in vertical section, of my device attached to the rear bumper of an automobile.

Fig. 4 is a perspective view of the mounting means for the auxiliary wheel of the device.

Referring to the drawings, 5 designates a conventional automobile having an instrument board 6 and a speedometer head 7 secured thereto. 8 designates the rear bumper of said automobile.

In detail, my invention comprises an auxiliary wheel 9 having a wire-spoked body 10 supporting the usual metal rim 11 to which is fitted the pneumatic tire 12. This type of wheel is preferred, in view of its strength and lightness, but it should be understood that other forms of surface wheels may be employed in conjunction with the other elements of my invention. However, the wheel of whatever type employed, will be provided with a conventional axle 13 rotatably supporting the hub 14 of the wheel.

The wheel is connected to the rear bumper 8 or the like of a vehicle, by means of draft mechanism designated generally at 15. This device comprises a fork 16, the arms 17 of which are pivotally mounted at their rear ends on the axle 13. The fork may be made of a one-piece metal casting, or if preferred, its arms may be made separate and suitably joined together at one end, as shown at 18, by means of bolts 19. The closed end 18 of the fork is detachably secured to a pivoted connecting element 20, comprising a pair of spaced upright triangular-shaped metal plates 21, preferably formed integral with a plate 22 constituting the base of said triangular plates. Any suitable means, such as bolts 23 engage apertures in the base 22 and closed end 18 of the fork 16 for detachably securing the fork to the pivoted connecting element 20. Each plate 21 is provided with an aperture 24 at the apex of the triangle to receive a bolt 25 for a purpose hereinafter described.

To complete the attachment of my device to the rear bumper of an automobile, I provide a bracket including a substantially inverted T-shaped member 26, the stem 27 of which is bent outwardly to form a projecting arm 28, adapted to fit in the space between the triangular shaped plates 21. The free end of this arm is provided with an eye 29. When the bolt 25 is inserted through the aperture in the apex of one of the triangular plates 21, it will also pass through the eye 29 and the aperture in the second triangular plate 21, thereby making a pivotal connection between the member 20 and the inverted T-shaped member 26. A nut 25a is screwed on to the projecting portion of the threaded bolt 25 for maintaining the parts in assembled relation.

The cross head 30 of the inverted T-shaped member 26 may be formed integral with the stem 27, or if desired, the head 30 may be rigidly secured to the stem by means of a rivet or the like, as indicated at 31. A plurality of superposed spaced apertures 32 are provided on the vertical stem 27 and are adapted to receive a pair of threaded bolts 33 which in turn engage apertures 35 in a vertical bar or plate 36 forming part of the bracket. In practice, the stem 27 of the member 26 is placed against the outer surface of the bumper 8, and the bar 36 is placed against the inner surface of said bumper, with the apertures 32 and 35 in alignment. The upper one of the bolts 33 is then inserted through the apertures 32 and 35 nearest the top edge of the bumper, while the second or lower one of the bolts 33 is inserted through the apertures 32 and 35 nearest the bottom edge of the bumper. Facing leather or other suitable material (not shown), may be secured to the inner faces of the members 27 and 36 of the bracket in any practicable way to prevent marring the surface of the bumper or other part of the motor vehicle to which the device is attached. The stem 27 and plate 36 are maintained in the assembled relation described above by means of nuts 37 engaging the threaded portion of the bolts 33 which project outwardly through the apertures 35.

It will thus be seen that I have provided an adjustable draft mechanism for connecting the auxiliary wheel 9 to the rear bumper of an automobile whereby the wheel may be towed by the vehicle in upright position. For the purpose of maintaining the auxiliary wheel 9 on the road surface at all times during travel of the vehicle, to insure traction, I provide a pair of spaced coil springs 38 arranged substantially parallel to one another and having suitable ring connections 39 at one end thereof. Each of the rings 39 engages an end of the axle 13, and these rings are held in place on said axle, in abutting relation with the terminal ends of the arms 17 of the fork 15, by means of the nuts 40 which are screwed on to the threaded ends of said axle. The forward ends of the springs 38 are also provided with ring fasteners 41 connected to a pair of threaded eye bolts 42 by means of links 43 or the like. Each eye bolt 42 is adapted to engage apertures in an outer end of the cross head 30 of the inverted T-shaped member 26, and these bolts are held in position on said head 30 by means of nuts 45 or the like.

At this point it will be noted that the crosshead 30 is of approximately the same length as the axle 13, so that the wheel 9 may rotate freely in the space between the springs 38.

To complete the assembly of my device, I provide a conventional speedometer drive gear 46 detachably mounted on the axle 13, and arranged intermediate one of the terminal ends of the arms 17 and the hub 15 of the wheel. Spacing means, such as a washer 47 or the like, may be employed for maintaining the gear 46 out of contact with the terminal end of one of the arms 17. A flexible shafting or cable 48 is connected at one end and leads from said gear 46, and is provided at its free end with a speedometer head or speed indicating means 49. As will be apparent from the drawings, the cable 48 should be of sufficient length to reach into the driver's seat of the automobile.

From the above, it is believed that the manner of assembling my device and attaching the same to the rear bumper of an automobile or the like will be apparent, and with regard to the operation of the device, it may be pointed out that after the operator has completed the attachment of the draft mechanism to the vehicle, he may then carry the free end of the speedometer cable 48 with the head 49 attached thereto, into the front seat of the vehicle. If desired, some suitable means (not shown), may be provided for detachably securing the head 49 to the instrument board 6 or steering wheel or post of the vehicle, preferably on the right hand side of the driver and above the dash board. However, as my device is employed principally in making tests which require driving of the vehicle only a relatively short distance, I find that the purposes of my invention may be readily accomplished without attaching the free end of the cable 48 to the instrument board of the vehicle, and in that event, the driver may hold the head 49 in his right hand and drive the automobile with his left hand. In either case, as the vehicle moves over the roadway, the speed of the vehicle will be accurately indicated to the driver by the pointer 50 on the speedometer head 49.

From the foregoing it will be appreciated that due to the fact that my device is relatively simple and can be easily transported, the speedometer assembly mounted on the auxiliary wheel may be easily checked and corrected from time to time whenever necessary, to insure an accurate indication of the rate of speed of the vehicle to which my device may be attached. Manifestly then, my device may be readily attached to various types of vehicles for the purpose of testing the accuracy of the conventional speed indicating means employed in such vehicles. I have also found my device to be particularly useful for accurately indicating the speed of an automobile in making brake tests. At the present time, in making such tests on automobiles involved in serious accidents, to determine whether or not the brakes on that automobile are adequate, it is necessary to utilize the services of two men, one to drive the automobile, and the other to drive a motorcycle alongside the same to determine the speed of the automobile. This is due to the fact that the conventional speed indicating means now employed on automobiles are usually connected to a wheel or some other moving part of the automobile, and are therefore subjected to constant wear, and frequently get out of order, especially after the automobile has been in an accident. Consequently, in making brake tests on automobiles, the operator cannot rely on the speedometer of the automobile for accurately checking the speed at which the car is travelling, and must therefore rely upon the statement of the motorcycle driver for this purpose.

With my device, on the other hand, the operator about to make a brake test on an automobile can simply attach my device to the automobile and by arranging the speedometer head adjacent to the front seat of the machine, he can accurately determine the rate of speed of the car at any time during its travel over the road. Obviously then, the operator will know the exact speed at which the car was travelling at the time the brake pedal was actuated, and he may at the same time, if he so desires, check the accuracy or inaccuracy of the speedometer forming part of the automobile undergoing the brake test.

After completing a test of the character above outlined, my device may be readily detached from the vehicle by removing the bolts 34. At this time, the device may be attached to another vehicle for testing the brakes or the speedometer of that vehicle, or if necessary, my device may be taken to the shop and checked to insure the accuracy of the speed indicating means for the next test.

While I have disclosed my device applied to an automobile, it is apparent that it may also be attached to other motor vehicles for the same purpose without departing from the spirit of the invention.

From the foregoing it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. Means for testing the conventional speedometer of a motor vehicle, comprising an auxiliary wheel, draft mechanism detachably connecting said wheel to the vehicle, said draft mechanism including a bracket vertically adjustable relatively to the vehicle for fixedly connecting said draft mechanism in various positions relatively to the vehicle, and speed indicating means driven by the auxiliary wheel and having an indicating head adapted to be positioned in close proximity to the driver's seat of said vehicle.

2. Means for testing the conventional speedometer of a motor vehicle, comprising an auxiliary wheel, draft mechanism detachably connecting said wheel to the vehicle, said draft mechanism including a pair of apertured plates vertically adjustable relatively to the vehicle for fixedly connecting said draft mechanism in various positions relatively to the vehicle, and speed indicating means driven by the auxiliary wheel and having an indicating head adapted to be positioned in close proximity to the driver's seat of said vehicle.

3. Means for testing the conventional speedometer of a motor vehicle, comprising an auxiliary wheel, draft mechanism detachably connecting said wheel to the vehicle, means for vertically adjusting said draft mechanism with respect to the vehicle, means connected to said draft mechanism and said wheel for yieldingly maintaining the auxiliary wheel in contact with the surface over which the vehicle travels, and speed indicating means driven by the auxiliary wheel and having an indicating head adapted to be positioned in close proximity to the driver's seat of said vehicle.

4. Means for testing a conventional speedometer of a motor vehicle, comprising an auxiliary wheel, an axle supporting said wheel, draft mechanism detachably connecting said axle and wheel to the vehicle, said draft mechanism including a bracket, springs secured to the bracket and operatively connected to the axle for holding the wheel in contact with the surface over which the vehicle is travelling, and speed indicating means driven by the auxiliary wheel and having an indicating head adapted to be positioned in close proximity to the driver's seat of said vehicle.

5. Means for testing a conventional speedometer of a motor vehicle, comprising an auxiliary wheel, an axle supporting said wheel, draft mechanism detachably connecting said axle and wheel to the vehicle, said draft mechanism including a bracket vertically adjustable relatively to the vehicle for fixedly connecting said draft mechanism in various positions relatively to the vehicle, springs secured to the bracket and operatively connected to the axle for holding the wheel in contact with the surface over which the vehicle is travelling, means for varying the tension of said springs, and speed indicating means driven by the auxiliary wheel and having an indicating head adapted to be positioned in close proximity to the driver's seat of said vehicle.

GEORGE F. MARSHALL.